(No Model.)
E. R. SIMPSON, S. B. MOTT & M. SPEICHER.
LUBRICATOR.
No. 370,979. Patented Oct. 4, 1887.
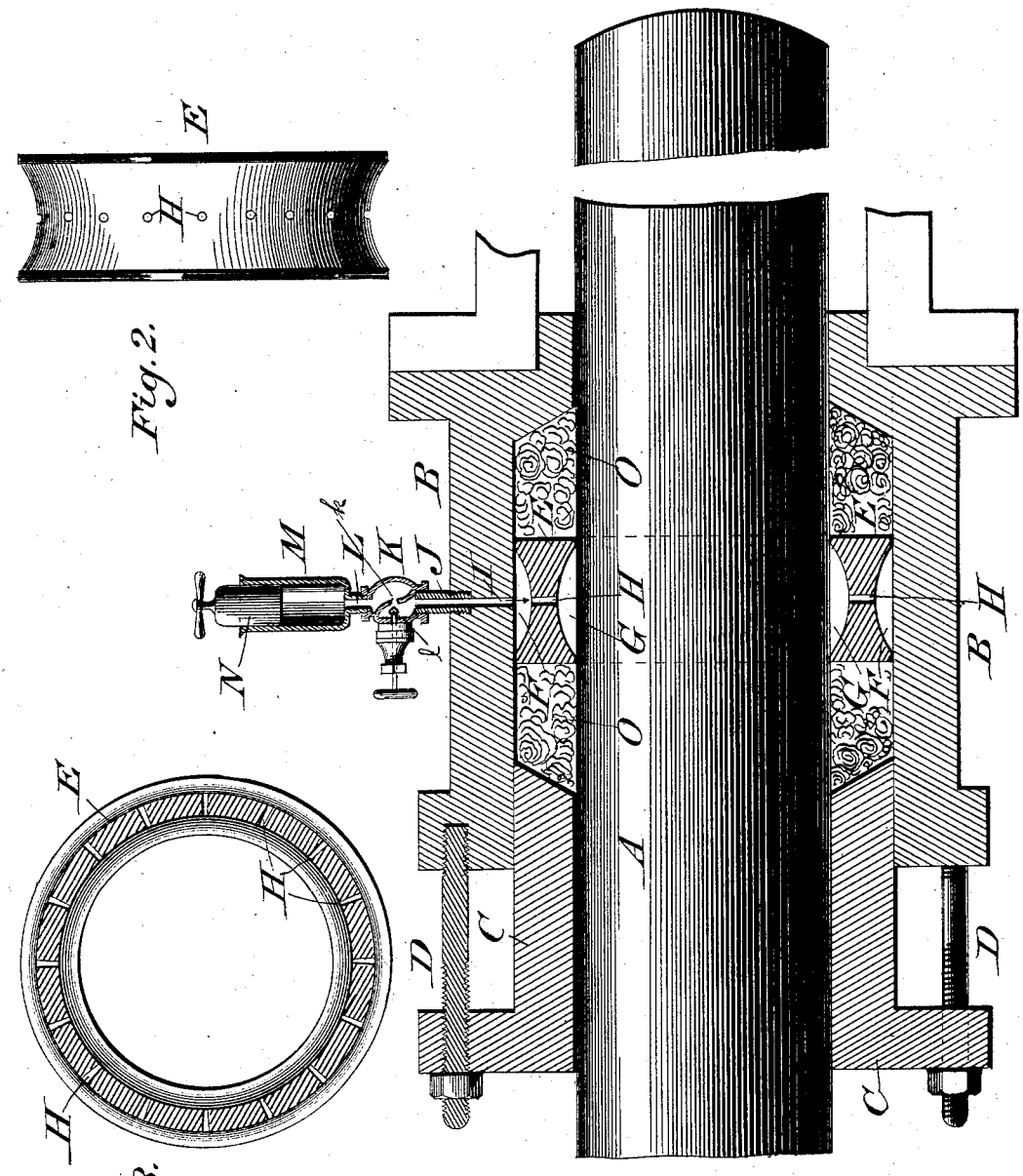
Witnesses
F. H. Schott
H. M. Payne
Inventors
Ellis A. Simpson
Smith B. Mott
Mathias Speicher
By their Attorney
W. A. Ruff

UNITED STATES PATENT OFFICE.

ELLIS R. SIMPSON AND SMITH B. MOTT, OF SCRANTON, AND MATHIAS SPEICHER, OF ARCHBALD, PENNSYLVANIA.

LUBRICATOR.

SPECIFICATION forming part of Letters Patent No. 370,979, dated October 4, 1887.

Application filed June 6, 1887. Serial No. 240,472. (No model.)

*To all whom it may concern:*

Be it known that we, ELLIS R. SIMPSON and SMITH B. MOTT, of Scranton, and MATHIAS SPEICHER, of Archbald, in the county of Lackawanna and State of Pennsylvania, have invented certain new and useful Improvements in Lubricators for Plungers and Piston-Rods; and we do hereby declare the following to be a full, clear, and exact description of the invention, such as will enable others skilled in the art to which it appertains to make and use the same.

Our invention relates to an improvement in lubricators and packing for plungers and piston-rods of pumps, the object thereof being to provide means whereby the plungers and piston-rods will at all times be provided with a coating of grease or other lubricant, whereby the friction is reduced to a minimum, and being thus constantly supplied or coated with grease the probabilities of acidulated water destroying the same is almost entirely removed. A further object is to provide means of the above character which shall be simple and economical in construction and durable and effective in use; and with these ends in view our invention consists in the certain features of construction and combination of parts hereinafter fully described, and pointed out in the claim.

In the accompanying drawings, Figure 1 is a vertical sectional view of our improvement. Fig. 2 is a top view of the ring, and Fig. 3 a vertical sectional view of ring.

A represents a plunger of the desired construction.

B represents a stuffing-box of a pump, to which is secured at one side the gland C by means of suitable bolts, D, as shown.

E represents a metallic ring, provided on its outer rim with the annular grooves F and on its inner rim with a similar groove, G. The ring is also provided with the perforations H, located in the center thereof at suitable intervals apart. The ring E is secured in the packing-box around the plunger by means of a hemp or other suitable packing, O, which will prevent the lubricant from running and thereby causing a waste or loss of material. As will be seen from the drawings, the ring is located at or near the center of the stuffing-box, the upper portion of said box being provided with the channel or passage I. The said channel is provided at its upper end with suitable female screw-threads to accommodate the male screw formed on the end of the supply-tube J. The oil or grease cup is secured to the box, as shown, and is provided with the passage L and the stop-cock or valve K, provided with the opening k, the said opening being governed by the stop-cock l, a tallow, tar, or other proper lubricating-cup, M, and a forcing-plug, N, as shown, which may be provided with screw-threads, if desired. The ring is located in the box in such manner as to have one of the perforations H in constant communication with the channel or passage I, although this is not necessary, owing to the construction of the groove F, which is such as to constantly receive the lubricant, and by means of which a certain quantity may at all times be transmitted to the rod or plunger.

From the above it will be seen that the lubricant passes from the cup M through the channel L into the passage I, from whence it passes to the groove F, which it fills, and then through the perforations H into the groove G. It fills the same, and is thus placed in direct contact with the plunger or piston-rod.

If the device should be used on a perpendicular pump, the cup should be so arranged as to rest vertically.

We would have it understood that we do not limit ourselves to the exact construction shown and described, but consider ourselves at liberty to make such changes and alterations as properly fall within the spirit and scope of our invention.

While we do not claim, broadly, the use of the device without the stop-cock K and the valve, yet we reserve the right to make the broad claim in a separate application.

Having described our invention, what we desire to claim and secure by Letters Patent is—

In a device adapted to lubricate a plunger or piston-rod, the combination of a packing-box provided with a passage-way, and a ring provided with annular grooves on its outer and inner faces, having perforations therein, a reservoir and a pressure-plug therein, and a valve or stop-cock between the ring and reservoir, substantially as set forth.

In testimony whereof we have signed this specification in the presence of two subscribing witnesses.

ELLIS R. SIMPSON.
SMITH B. MOTT.
MATHIAS SPEICHER.

Witnesses:
E. H. HOUSE,
T. D. THOMAS.